UNITED STATES PATENT OFFICE.

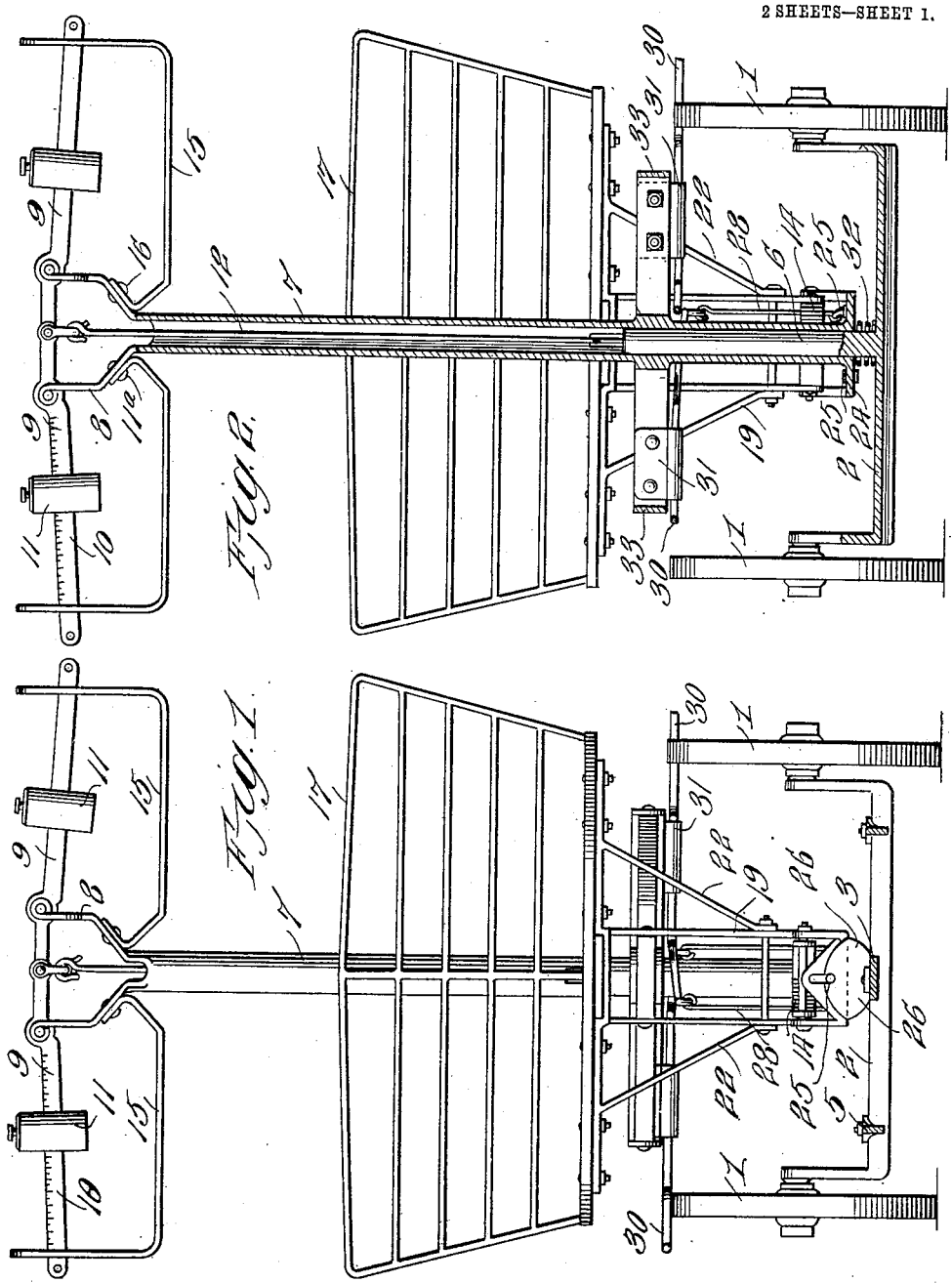

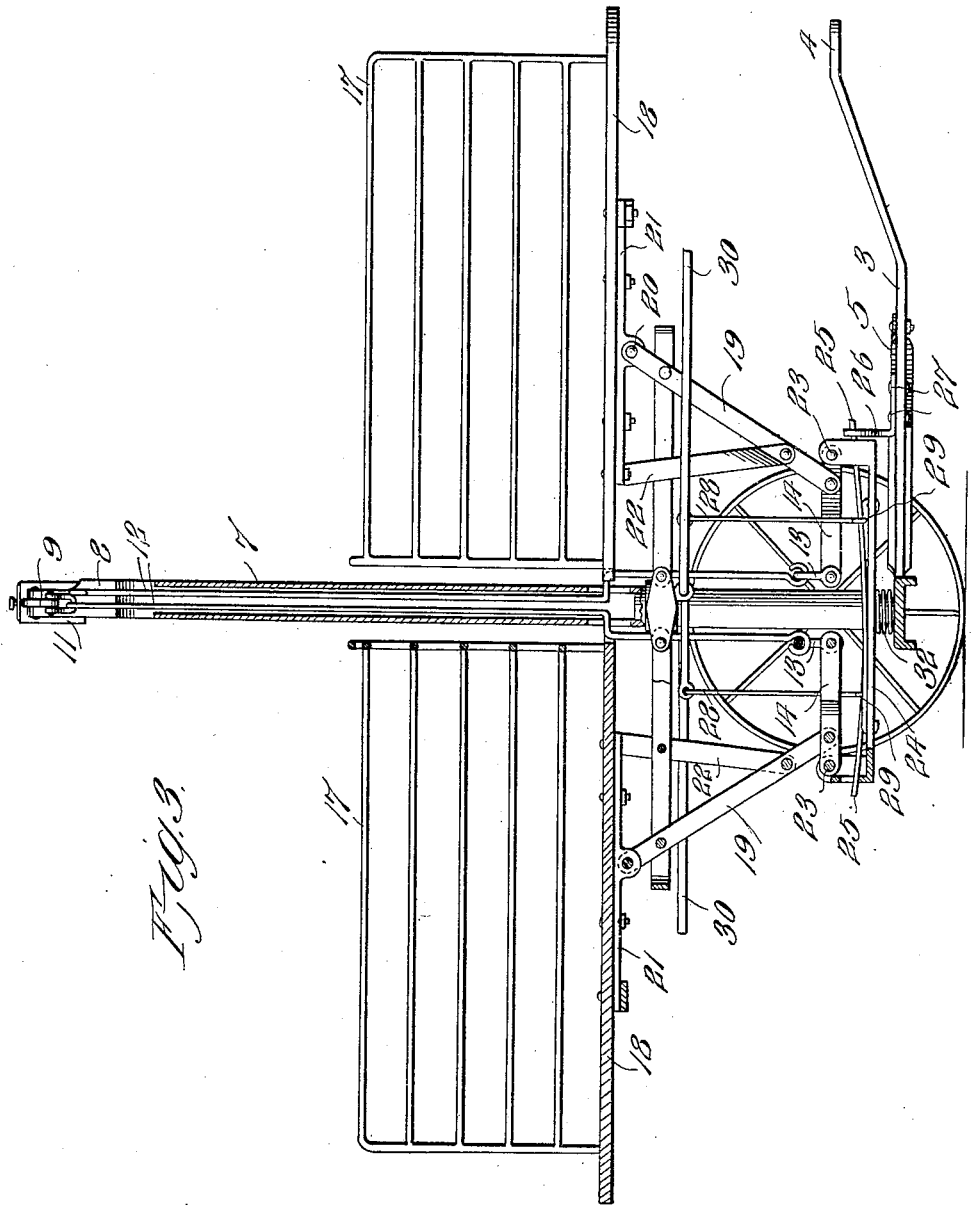

HERMAN AUE, OF LEON SPRINGS, TEXAS.

SCALE.

No. 920,004.  Specification of Letters Patent.  Patented April 27, 1909.

Application filed September 30, 1908. Serial No. 455,403.

*To all whom it may concern:*

Be it known that I, HERMAN AUE, a citizen of the United States of America, residing at Leon Springs, in the county of Bexar and State of Texas, have invented new and useful Improvements in Scales, of which the following is a specification.

This invention relates to scales designed for the purpose of weighing hay just prior to feeding it into a baling press, and one of the principal objects of the invention is to provide a pair of hay racks mounted upon a wheeled truck and having means whereby the hay thrown into the racks can be weighed and swung into position for feeding it into the baling press.

Another object of the invention is to provide means whereby the hay racks may be quickly swung into position to receive the hay to be weighed and to permit the same to be swung into position to feed the hay to the baler, said racks being held in their respective positions by means of a hand-operated latch.

These and other objects may be attained by means of the construction illustrated in the accompanying drawings, in which,—

Figure 1 is a front elevation of a scale made in accordance with my invention, the tongue or handle and brace therefor being shown in section. Fig. 2 is a central vertical section of the same. Fig. 3 is a vertical section taken at right angles to Fig. 2.

Referring to the drawing, the numeral 1 designates the wheels and 2 the drop axle to which the wheels are journaled. Connected to the axle 2 is a draft tongue 3 provided with a suitable clevis 4, said tongue having diagonal braces or hounds 5 secured to the tongue and axle. Formed integral with and projecting upward from the axle 2 is a post 6. Mounted upon the post 6 is a tubular standard 7, the upper ends 8 of which are arranged to diverge, and pivotally connected at the terminal ends of the diverging portions 8 are the steelyards 9 provided with indicating marks 10 and sliding weights 11. The steelyards are centrally connected by means of links 12 which pass through the tubular standards 7 to clevises 13 secured to the inner ends of levers 14. Guide bars 15 are secured at their inner ends to the upper end of the shaft 7 by means of rivets 16, the outer ends of said guide bars being provided with openings through which the outer ends of the steelyards project. Two hay racks 17, each supported upon a platform 18, are disposed upon opposite sides of the tubular standard 7, said racks being supported by means of levers 19 and suitable braces 20, the levers 19 being connected to the levers 14 at their lower ends, while the upper ends are connected by means of cross bolts 20 connected to brackets 21 secured underneath the platform 18. A brace 22 is connected at its lower end to the lever 19, its upper end being connected to the bracket 21. The outer ends of the levers 14 are each pivoted at 23 to a bar 24, and secured to said bar are oppositely disposed spring latches 25 adapted to engage a latch keeper 26 secured by means of bolts 27 to the tongue 3. For operating the spring latches 25 links 28 are connected to said latches by means of hooks 29, the upper ends of said links 28 being connected to levers 30 fulcrumed to metal loops 31. A spiral spring 32 surrounds the post 6 and supports the tubular standard 7.

Connected to the tubular standard 7 are oppositely projecting bars 33 to which are secured the metal loops 31 forming the fulcrums for the levers 30.

The operation of my invention may be briefly described as follows:—When in the position shown in Fig. 3, one of the racks 17 is filled with hay, and when a sufficient quantity has been placed in the rack to form a bale, which is determined by the steelyards and sliding weights, this rack is swung around in position to be fed to the baler by operating the levers 13 and raising the latch 25 from the latch keeper 26. While the hay is being taken from this loaded rack 17, the other rack is swung around in position to receive hay for the next bale. Each bale is of a predetermined size, owing to the fact that it is weighed in the rack before it is fed to the baler. The entire device may be connected to the baler by means of the clevis 4 whenever it is required to convey the device from place to place.

My invention is of simple construction, operates smoothly and efficiently for its purpose, can be manufactured at comparatively slight cost and is a very desirable attachment to a hay baler.

I claim:—

1. A hay scale comprising a truck provided with a drop axle, a post rising from said axle, a tubular standard mounted to rotate on said post, two steelyards pivoted to said standard, sliding weights on said steelyards, guide bars for said steelyards, hay racks provided with platforms, means for supporting said hay racks, means for connecting said supporting means with said steelyards, and means for holding said hay racks in adjusted position.

2. A hay scale comprising a pair of hay racks, a truck, a post projecting upward from said truck, a tubular standard mounted to rotate on said post, said hay racks being connected to said standard, and spring latches for holding the racks in operative positions.

3. A scale for weighing hay for a baling press comprising a truck, a post projecting upward from said truck, a spring, a tubular standard mounted to rotate on said post and supported by said spring, oppositely disposed hay racks supported upon said standard, latches for holding said racks in operative positions, and means for releasing said latches to permit the racks to be swung.

In testimony whereof I affix my signature in presence of two witnesses.

HERMAN AUE.

Witnesses:
LOUIS J. MOREAU,
JOE J. ADAMS.